H. W. WHITE & A. T. SHELDON.
ANTISKIDDING ARMOR FOR TIRES.
APPLICATION FILED FEB. 24, 1913.
1,158,607.
Patented Nov. 2, 1915.
2 SHEETS—SHEET 1.
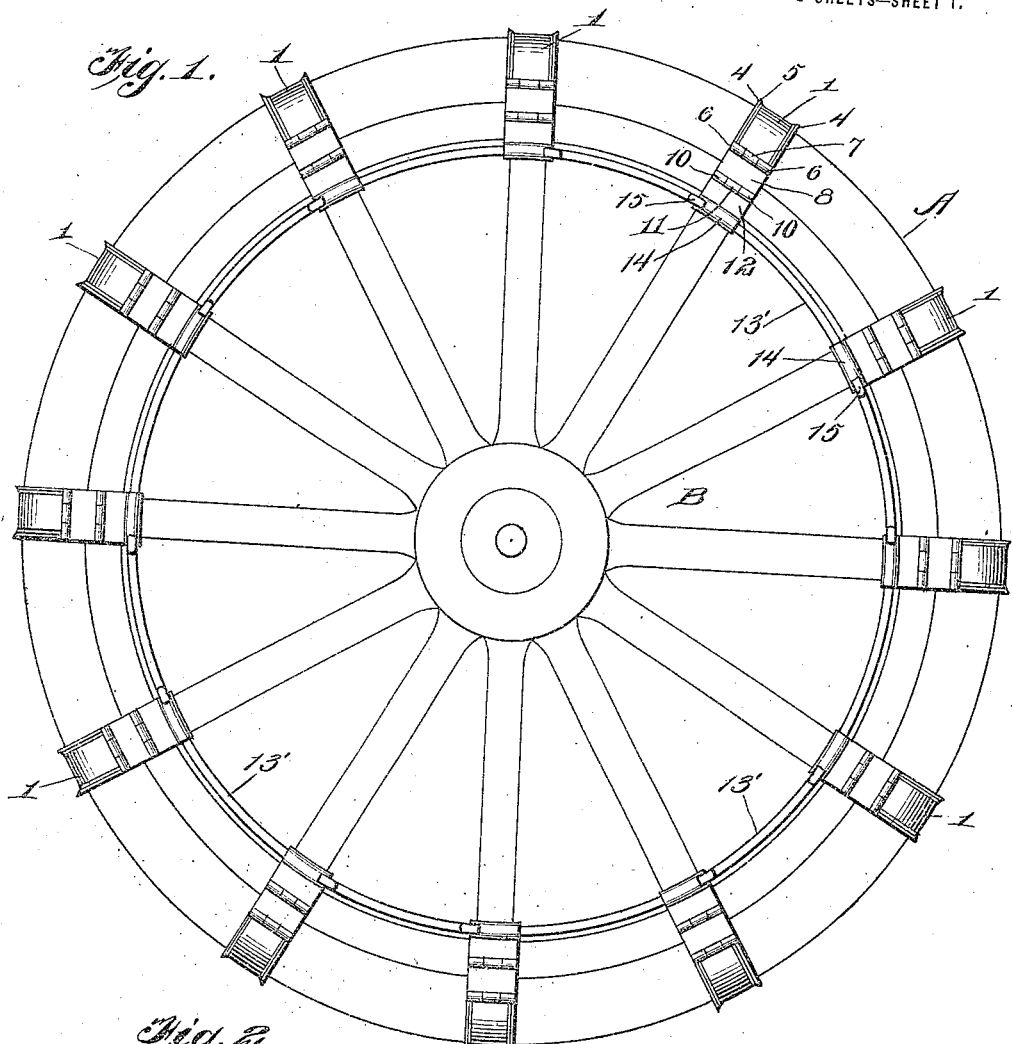
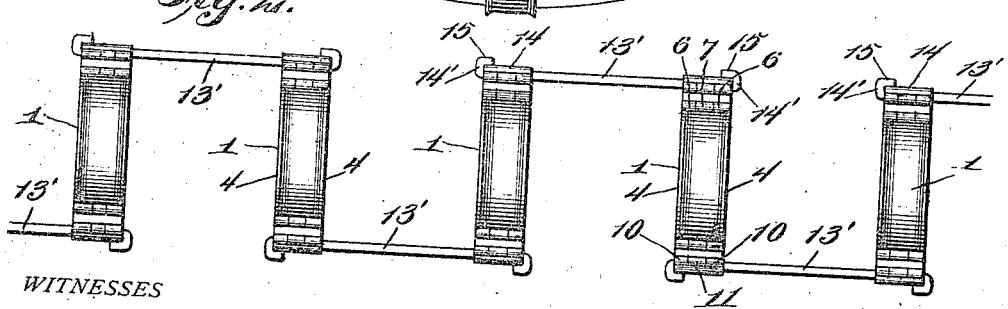
WITNESSES
INVENTORS
Harry W. White
Aurin T. Sheldon
By A. C. Hines, Attorney.

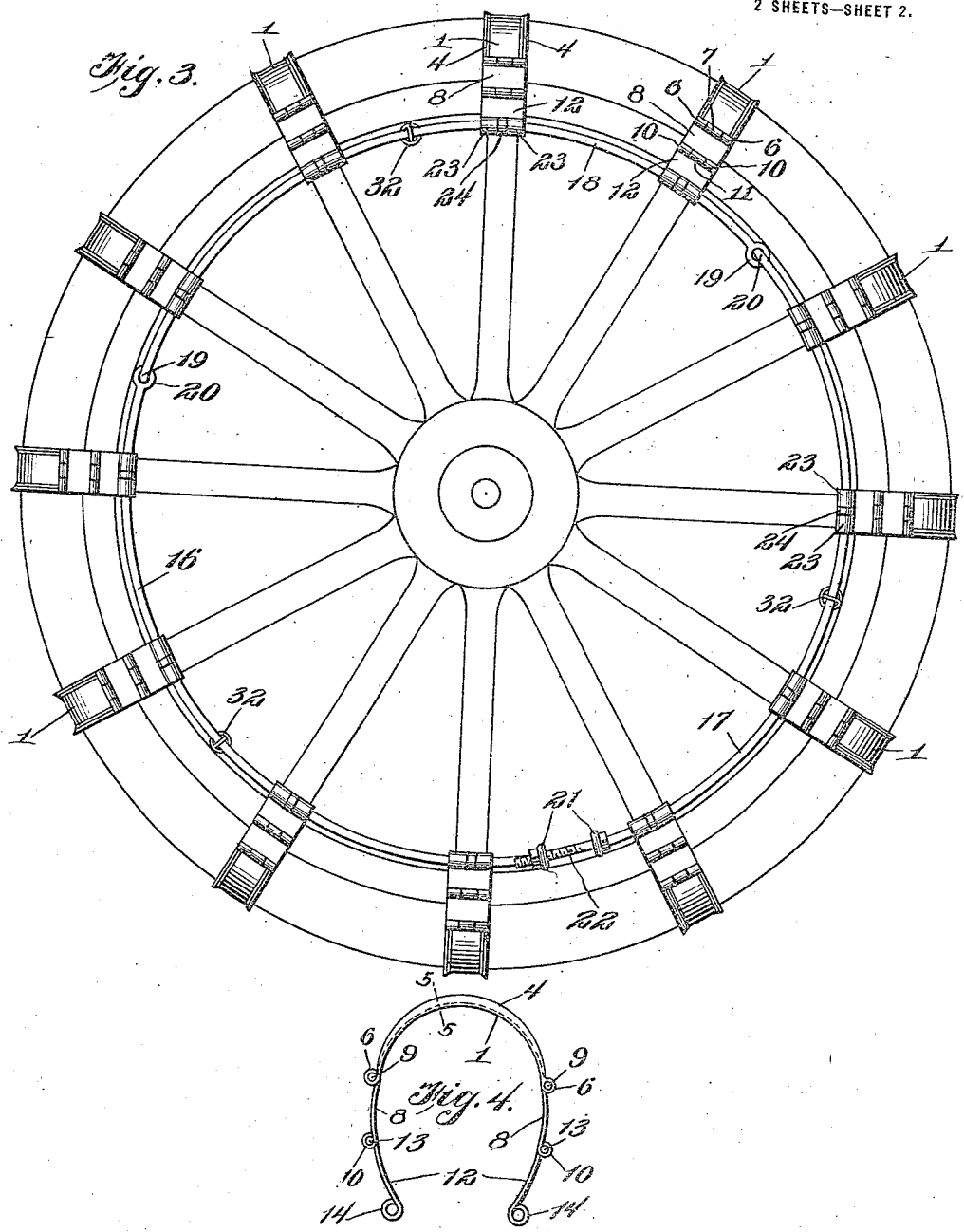

UNITED STATES PATENT OFFICE.

HENRY W. WHITE AND AURIN T. SHELDON, OF ATCHEE, COLORADO.

ANTISKIDDING ARMOR FOR TIRES.

1,158,607.   Specification of Letters Patent.   Patented Nov. 2, 1915.

Application filed February 24, 1913. Serial No. 750,331.

*To all whom it may concern:*

Be it known that we, HENRY W. WHITE and AURIN T. SHELDON, citizens of the United States, residing at Atchee, in the county of Garfield and State of Colorado, have invented certain new and useful Improvements in Antiskidding Armors for Tires, of which the following is a specification.

This invention relates to anti-skidding armors for tires; and it has for its object the provision of an armor which when applied to the tire will prevent excessive wear on the same and insure a proper purchase of the machine against the ground to positively prevent the skidding of the machine.

Another object of the invention is the provision of metallic tread sections or straps which may be arranged equi-distally around the tire and provided with oppositely inclined calk forming flanges which will be projected for such distances beyond the surface of the tire as will permit said edges to be properly advanced into the surface of the ground as the wheel revolves.

A further object of the invention is the provision of metallic tread sections or straps which may be connected with the wheel in such manner that will permit them to yield radially on radial deflection of the tire.

A still further object of the invention is the provision of means for connecting the tire embracing straps in series around the tire and the relative arrangement of the straps so that any particular section of the device may be removed with facility when worn.

Another object of the invention is the provision of means whereby the device may be quickly connected with or disconnected from any standard form of wheel and tire.

With these and other objects in view, the invention consists of certain novel features of construction, combination and arrangement of parts, as will be hereinafter described and claimed.

In the accompanying drawing:—Figure 1 is a side view of a vehicle wheel, showing the application of the invention thereto; Fig. 2 is a top plan view of a portion of the device removed from the wheel; Fig. 3 is a view similar to Fig. 1, showing a slightly modified form of the invention; Fig. 4 is an edge view of one of the tread sections; Fig. 5 is a section on line 5—5 of Fig. 4.

The device comprises yieldable metallic tread sections 1, which are preferably arranged equi-distally around the tire A of the wheel B conventionally illustrated herein. These sections are formed from flat metal strips which are curved so as to embrace the tire, and as illustrated in Fig. 5 each section has its main body portion curved transversely, as at 3, whereby to conform with the curvature of the tire A to readily adapt itself thereto. The side edges of the section are stamped, so as to present oppositely extending calks 4 tapering toward the extremities of said section, which are arranged substantially at an obtuse angle to the plane of the main body of the section so that relatively sharp edges 5 of the calks will be operatively exposed and arranged for presentation to the surface of the ground, as the wheel is revolved, thereby maximizing the purchasing efficiency of the wheel with the ground to prevent skidding of the wheel.

The calks 4 terminate slightly within the ends of the tread sections, and as illustrated the ends of the sections are provided with knuckles 6, which are alined with knuckles 7 of hinge plates 8, which are disposed against the sides of the tire. The knuckles thus alined are connected together by pins 9, as shown in Fig. 4. The hinge plates 8 are provided with knuckles 10 normally lying in vertical alinement with the knuckles 6 and are alined with knuckles 11 of hinge plates 12. These alined knuckles are connected together by hinge pins 13, as shown in Fig. 4. From this construction it is evident that each tread section is rendered radially flexible and laterally flexible, so as to respond to all yielding movements of the tire.

The attaching device for holding the tread sections properly associated with the tire includes spaced series of arcuate rod sections 13, which are preferably located at the sides of the wheel at points adjacent to the rim. The sections are arranged relatively, so that the rods of one series are offset from the rods of the other series, as shown in Fig. 2. In other words, the rods of one series are located immediately opposite the spaces between rods of the opposite series. The hinge plates 12 are provided with loops 14, and as illustrated the loops of each tread section 1 receive one rod of each series of rods forming the attaching or connecting device. The terminals of the rods are extended through the loops 14 and they are then offset at 14' therefrom and then finally upstruck at 15 against the loop, as shown in Fig. 2. The ends 15 are bendable, so as to permit any one or a required number of tread sections 1 of the armor to be removed from the tire without affecting the other sections of the device.

The attaching or connecting device shown in Fig. 3 comprises ring sections 16, 17 and 18, the latter having terminal eyes 19 fitted in the eyes 20 of the sections 16 and 17, as shown. The sections 16 and 17 are provided with right angularly extending eyes 21, through which a fastening bolt 22 is extended and arranged, so that the sections 16, 17 and 18 can be adjusted to securely clamp the tread sections 1 of the armor against the tire. The tread sections 1 shown in this form of the invention have their inner plates 12 provided with companion knuckles 23, which are spaced relatively and disposed beside lugs 24, which extend from the rod sections of the connecting member. These lugs serve to hold the tread sections against creeping, as will be understood.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described our invention, what we claim is:—

A tire armor comprising members embracing the tire, and means for spacing said members apart, each of said members comprising an arcuate tread section having its parallel longitudinal edges upturned to provide calks that taper toward the extremities of the section, a pair of oppositely disposed plates having their upper extremities hinged to the extremities of said section and a second pair of plates having their upper edges hinged to the lower extremities of the first mentioned plates in vertical alinement with their hinged connections with said tread section, said second mentioned plates having their lower extremities formed into loops that are disposed out of vertical alinement with said first mentioned plates, said means passing through the loops.

In testimony whereof we affix our signatures in presence of two witnesses.

HARRY W. WHITE.
AURIN T. SHELDON.

Witnesses:
HARRY E. BLAKELY,
JOHN BOULTER.